US008301798B2

(12) United States Patent
Mond et al.

(10) Patent No.: US 8,301,798 B2
(45) Date of Patent: Oct. 30, 2012

(54) SYSTEM AND METHOD FOR PROCESSING LARGE AMOUNTS OF TRANSACTIONAL DATA

(75) Inventors: Amar Mond, Edison, NJ (US); Amit Agrawal, Jersey City, NJ (US)

(73) Assignee: Barclays Captial Inc., New York, NY (US)

(*) Notice: Subject to any disclaimer, the term of this patent is extended or adjusted under 35 U.S.C. 154(b) by 45 days.

(21) Appl. No.: 12/483,983

(22) Filed: Jun. 12, 2009
(Under 37 CFR 1.47)

(65) Prior Publication Data

US 2010/0318674 A1  Dec. 16, 2010

(51) Int. Cl.
*G06F 15/16* (2006.01)

(52) U.S. Cl. ............... 709/234; 709/201; 709/203

(58) Field of Classification Search .......... None
See application file for complete search history.

(56) References Cited

U.S. PATENT DOCUMENTS

| | | | | |
|---|---|---|---|---|
| 5,983,214 | A * | 11/1999 | Lang et al. | 725/116 |
| 6,625,651 | B1 * | 9/2003 | Swartz et al. | 709/226 |
| 7,359,956 | B2 | 4/2008 | Kanai et al. | |
| 7,827,282 | B2 * | 11/2010 | Sorrentino et al. | 709/226 |
| 8,073,934 | B1 * | 12/2011 | Zhong et al. | 709/220 |
| 2004/0133680 | A1 | 7/2004 | Sorrentino et al. | |
| 2007/0067606 | A1 | 3/2007 | Lin et al. | |
| 2007/0282951 | A1 | 12/2007 | Selimis et al. | |

FOREIGN PATENT DOCUMENTS

| EP | 1324564 A2 * | 7/2003 |
|---|---|---|
| WO | WO 2007134250 A2 * | 11/2007 |

OTHER PUBLICATIONS

SAP Data Synchronization Conversion Solution for Configuration Data and associated Master Data and Transactional Data. IBM Technical Disclosure Bulletin. Nov. 1, 1999. UK. Issue 427, p. 1552. 6 Pages.*
PCT International Search Report, dated Jul. 20, 2010.
Written Opinion of the International Searching Party, Dated Jul. 20, 2010.

* cited by examiner

*Primary Examiner* — Jeffrey R Swearingen
(74) *Attorney, Agent, or Firm* — Amster, Rothstein & Ebenstein LLP

(57) ABSTRACT

A system including a reference data server that stores a first set of data used in the plurality of processes, a load balancer that reconfigures the transactional data, a first stage processing system and a second stage processing system. The first stage processing system includes one or more first processing modules that execute at least one process of a first set of the plurality of processes on the reconfigured transactional data to generate first stage processed transactional data, each of the one or more first processing modules comprising an in-memory cache that stores a second set of data used in the at least one process, and a first stage data storage system that stores the first stage processed transactional data. The second stage processing system includes one or more second processing modules that execute at least one process of a second set of the plurality of processes on the first stage processed transactional data to generate second stage processed transactional data, each of the one or more second processing modules comprising an in-memory cache that dynamically stores a third set of data related to the at least one process, and a second stage data storage system that stores the second stage processed transactional data.

19 Claims, 4 Drawing Sheets

SYSTEM AND METHOD FOR PROCESSING LARGE AMOUNTS OF TRANSACTIONAL DATA

FIELD OF THE INVENTION

The present invention relates to a computer system and computer system-implemented method for processing large amounts of transactional data.

SUMMARY OF THE INVENTION

A system according to an exemplary embodiment of the present invention comprises: a configuration service system that generates information related to configuration of a plurality of processes to be performed on transactional data; a reference data server that stores a first set of data used in the plurality of processes; a load balancer that reconfigures the transactional data; a first stage processing system comprising: one or more first processing modules that execute at least one process of a first set of the plurality of processes on the reconfigured transactional data to generate first stage processed transactional data, each of the one or more first processing modules comprising an in-memory cache that stores a second set of data used in the at least one process; and a first stage data storage system that stores the first stage processed transactional data; a second stage processing system comprising: one or more second processing modules that execute at least one process of a second set of the plurality of processes on the first stage processed transactional data to generate second stage processed transactional data, each of the one or more second processing modules comprising an in-memory cache that stores a third set of data related to the at least one process; and a second stage data storage system that stores the second stage processed transactional data; and a flow controller that manages flow of data between the first and second stage processing systems.

In at least one embodiment, the information generated by the configuration service system comprises one or more of the following: rules related to the plurality of processes, input and output data sources for the plurality of processes, configuration of the in-memory caches, information related to communication queues, component specific parameters for the plurality of processes, and communication adapters required for each of the plurality of processes.

In at least one embodiment, each of the one or more first and second processing modules comprise a rule executor that applies an associated set of rules.

In at least one embodiment, reconfiguring of the transactional data is performed by the load balancer by eliminating interdependencies within the transactional data.

In at least one embodiment, the first set of data comprises reference data required for processing the transactional data.

In at least one embodiment, each of the one or more first and second processing modules comprises one or more adapters for interfacing with various types of data.

In at least one embodiment, the types of data are selected from the following: database data, messaging system data, file system data, and e-mail system data.

In at least one embodiment, the first and second stage data storage systems are selected from the following type of data storage systems: databases, messaging systems, files systems and e-mail systems.

A method of processing large amounts of transactional data according to an exemplary embodiment of the present invention comprises the steps of: receiving configuration data at a configuration service system, the configuration data related to configuration of a plurality of processes to be performed on the transactional data; storing a first set of data used in the plurality of processes at a reference data server; reconfiguring the transactional data at a load balancer; storing a second set of data at an in-memory cache associated with a first processing module of a first stage processing system; executing at the first processing module using the second set of data at least one process of a first set of the plurality of processes on the reconfigured transactional data to generate first stage processed transactional data; storing the first stage processed transactional data in a first stage data storage system; storing a third set of data at an in-memory cache associated with a second processing module of a second stage processing system; executing at the second processing module using the third set of data at least one process of a second set of the plurality of processes on the first stage processed transactional data to generate second stage processed transactional data; storing the second stage processed transactional data in a second stage data storage system; and managing using a flow controller flow of data between the first and second stage processing systems.

A computer system according to an exemplary embodiment of the present invention comprises one or more processors, one or more communication devices operatively connected to the one or more processors, and one or more computer-readable media containing computer-readable instructions executable on the one or more processors, the instructions being related to performance of a method for processing large amounts of transactional data, comprising the steps of: receiving configuration data at a configuration service system, the configuration data related to configuration of a plurality of processes to be performed on the transactional data; storing a first set of data used in the plurality of processes at a reference data server; reconfiguring the transactional data at a load balancer; storing a second set of data at an in-memory cache associated with a first processing module of a first stage processing system; executing at the first processing module using the second set of data at least one process of a first set of the plurality of processes on the reconfigured transactional data to generate first stage processed transactional data; storing the first stage processed transactional data in a first stage data storage system; storing a third set of data at an in-memory cache associated with a second processing module of a second stage processing system; executing at the second processing module using the third set of data at least one process of a second set of the plurality of processes on the first stage processed transactional data to generate second stage processed transactional data; storing the second stage processed transactional data in a second stage data storage system; and managing using a flow controller flow of data between the first and second stage processing systems.

In at least one embodiment, the steps of executing are performed using a multithreading technique.

In at least one embodiment, the information generated by the configuration service system comprises rules related to the plurality of processes, and the steps of executing comprise application by the first and second processing modules of an associated set of rules.

In at least one embodiment, the step of reconfiguring comprises at least one of eliminating and reducing interdependencies within the transactional data.

In at least one embodiment, the method further comprises modifying format of data at data adapters associated with each of the first and second processing modules so that the first and second processing modules are capable of interfacing with the first and second data storage systems and the reference data server.

In at least one embodiment, the step of modifying comprises converting the data to one or more of the following formats: database data, messaging system data, file system data and e-mail system data.

BRIEF DESCRIPTION OF THE DRAWINGS

The above and related objects, features and advantages of the present invention will be more fully understood by reference to the following, detailed description of the preferred, albeit illustrative, embodiment of the present invention when taken in conjunction with the accompanying figures, wherein.

DETAIL DESCRIPTION OF THE PREFERRED EMBODIMENT(S)

The present invention is directed to a processing engine that may be divided into multiple logical stages, where each stage contains one or more processes that can accept data from various types of data input sources, apply dynamically injected rules to process the input data, and send the processed data to multiple data sources. In exemplary embodiments, interdependencies between data input to the processing engine are reduced and/or eliminated so as to reduce process bottlenecks, and the processing tasks within each stage are controlled so as to improve efficiency of the overall processing scheme.

Although examples of the inventive processing engine are provided herein within the context of financial transaction data, it should be appreciated that the systems and methods of the various exemplary embodiments of the present invention may be used to process any type of transactional data. The type of processing to be performed may depend on, for example, a user query or an automatically generated query input to the processing engine. In this regard, the term "generic process" will be used throughout the following description to refer to the specific query parameters, such as, for example, applied rules, data sources, communication channels, and system component configurations, to name a few, applied to each process within the processing engine.

Figure 1:
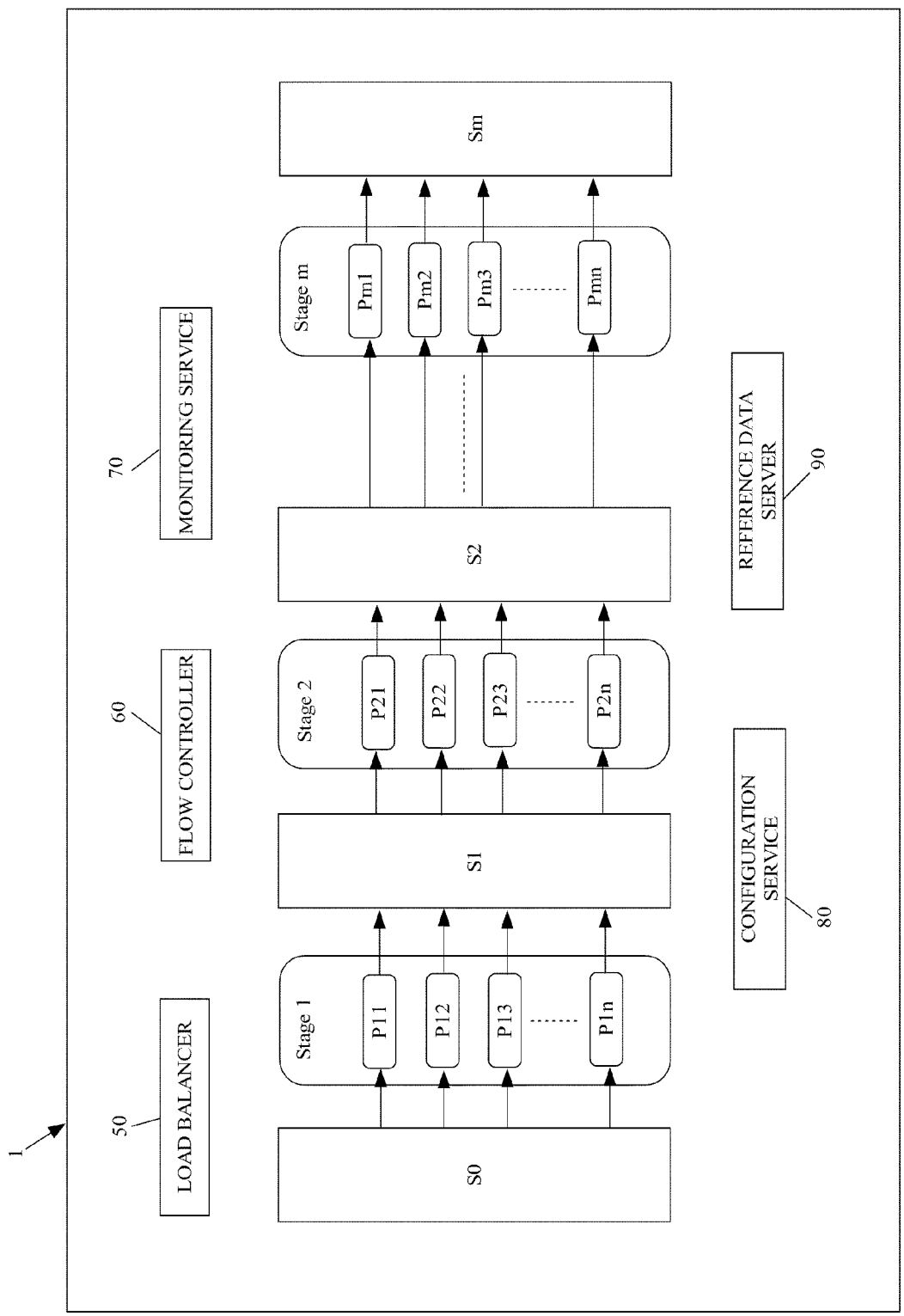
FIG. 1 is a block diagram showing the general system architecture of a processing engine according to an exemplary embodiment of the present invention.

FIG. 1 is a block diagram showing a system architecture of a processing engine, generally designated by reference number 1, according to an exemplary embodiment of the present invention. It should be appreciated that the various components of the processing engine 1 may be embodied in hardware components, software components, or a combination of software and hardware components.

The components of the processing engine 1 may include any number of data storage systems S0-Sm, any number of data processing stages Stage 1-Stage m, a load balancer 50, a flow controller 60, a monitoring service 70, a configuration service 80 and a reference data server 90. Within each data processing stage Stage 1-Stage m are one or more processing modules. For example, Stage 1 may include processing modules P11, P12, P13-P1$n$ (where n is any suitable integer), Stage 2 may include processing modules P21, P22, P23-P2$p$ (where p is any suitable integer), and Stage m may include processing modules Pm1, Pm2, Pm3-Pm$q$ (where q is any suitable integer).

The configuration service 80 may hold the configuration of all the components running on the system architecture of the processing engine 1. In this regard, each process running on the processing modules P11-P1$n$, P21-P2$p$, Pm1-Pm$q$ may originally be "dummy" processes, and a first step upon initialization of each process may be to contact the configuration service 80 and request an instance specific configuration. Each instance specific configuration may form part of a generic process that is loaded into the configuration service 80. At run-time, one instance of a generic process may be transformed into another instance by closing all input-output communication channels and then re-initializing using the newly loaded configuration from the configuration service 80. Thus, the configuration service 80 allows for generic processes to be loaded dynamically into the processing engine 1.

Each generic process may include configuration information that corresponds to a particular user query, including information related to communication adapters that need to be loaded for the specific instance of the generic process, the communication queues over which the configuration service will communicate, the rules which need to be injected for the specific instance, all component specific parameters, and input/output data sources. As explained in further detail below, each generic process may be configured to have an in-memory cache that can hold a set of objects loaded from specified sources. The features of the in-memory cache that can be configured include, for example, size of cache, invalidation/eviction policy, data types of objects in cache, source of data objects and automatic synchronization of cache data with data sources, to name a few.

The load balancer 50 distributes the processing load across multiple processes within a stage. In this regard, the load balancer 50 may organize the data input from data storage system S0 by, for example, eliminating or reducing inter-dependencies within the input data. The elimination and/or reduction of inter-dependencies allows for the various processes within a stage Stage 1-Stage m of the processing engine 1 to run without having to wait for processed data from any other stage Stage 1-Stage m. Thus, the load balancer 50 may improve the processability of the data. In an exemplary embodiment of the invention, the load balancer 50 may split large blocks of data into smaller blocks and distribute the smaller blocks to multiples processes within a stage. The number and size of smaller blocks and the number of processes to distribute over may be configurable.

The flow controller 60 maintains the data flow between the various stages Stage 1-Stage m and when each stage Stage 1-Stage m should process the data. For example, the flow controller 60 may hold the processing of data at a particular stage "N" until all the data is processed by previous stage "N−1". The flow controller 60 may have the ability to put on hold all the processes within a particular stage Stage 1-Stage m, and inform when these processes can start accepting data and proceed with processing. As data is processed within any one of the stages Stage 1-Stage m, the processed data is sent to the corresponding one of the data storage systems S0-Sm, for use by the following stage Stage 1-Stage m. The data storage systems S0-Sm may be, for example, databases, messaging systems, file systems or e-mail systems. The flow controlling information for each process and stage may be stored in the configuration service 80.

The monitoring service 70 provides a centralized view of each process running within the processing engine 1. In this regard, the generic process may include in-built communication points through which the monitoring service 70 can send and receive monitoring information from each process. The monitoring service 70 may be configured to request any process to publish specific information on a periodic basis. Further, the monitoring service 70 may give a user the capability to create logical units by grouping a set of processes and then set alerts for events produced in that group. If an alert is generated, the user may be provided with the option of dynamically pushing changes to the configuration of the one or more processes within the logical unit.

The reference data server 90 functions as a centralized repository of all reference data for the processing engine 1, including all static and dynamic data. All processes performed by the processing engine 1 may be configured with the in-built capability to communicate and receive all the required data from the reference data server 90. For example, any process may have the capability to register for updates on a particular data set from the reference data server 90, and/or a thin reference data agent running in the process may ensure that all the data in the process space is automatically synchronized with the data in the reference data server 90.

The reference data server 90 may be implemented as a set of servers running in a cluster and sharing data between them. The cluster of data servers may be either proprietary to the processing engine 1 or any commercial distributed data fabric such as, for example, Coherence, by Oracle Corporation, Redwood Shores, Calif., or GigaSpaces XAP, by GigaSpace Technologies, New York, N.Y.

Figure 2:
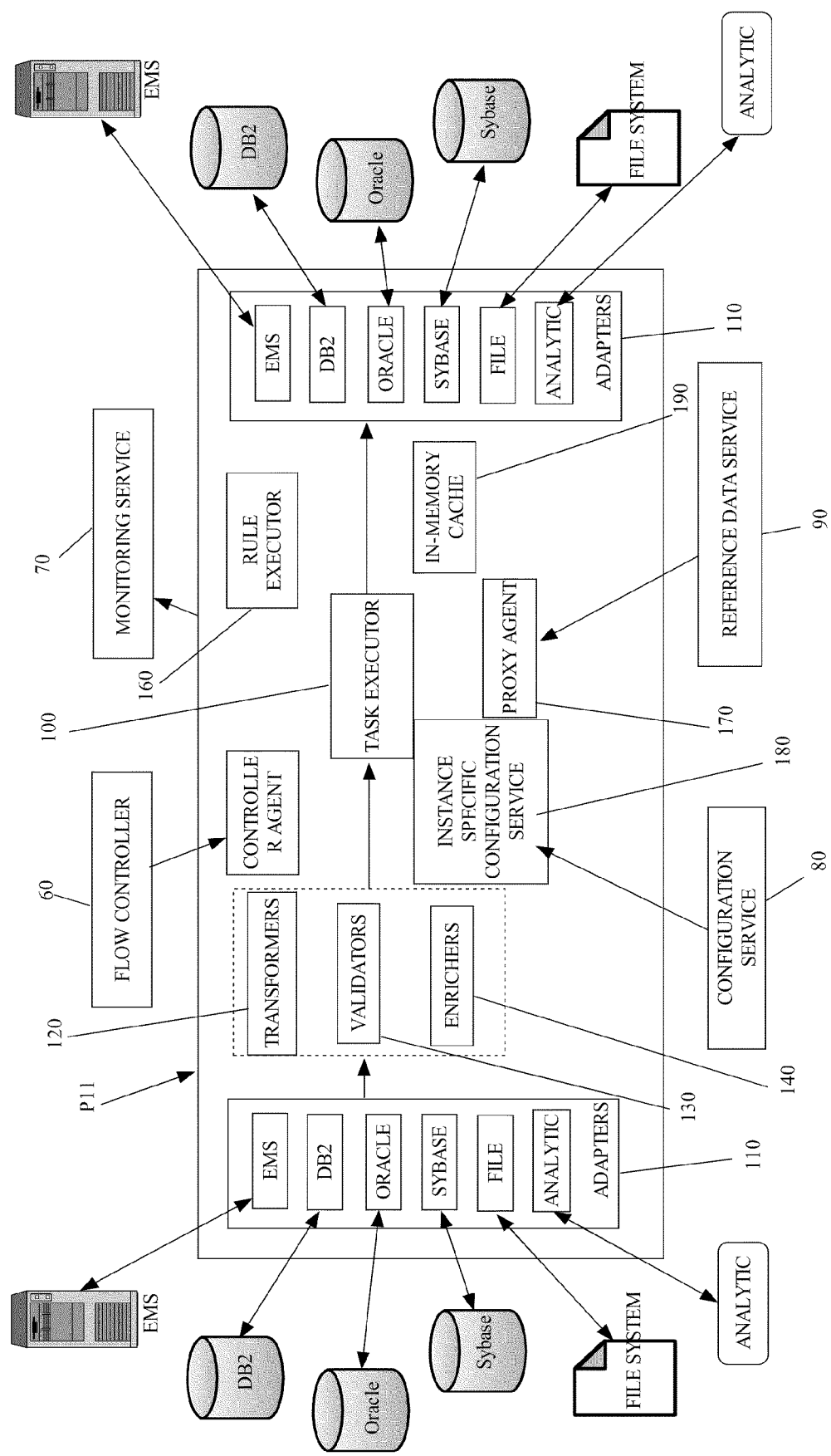
FIG. 2 is a block diagram of the processing module P11 of FIG. 1 as representative of the general system architecture of a processing module according to an exemplary embodiment of the present invention.

FIG. 2 is a block diagram of processing module P11 as representative of the general system architecture of all processing modules P11-P1n, P21-P2p, Pm1-Pmq within the processing engine 1. The processing module P11 may include a task executor 100, adapters 110, a data transformer 120, a data validator 130, a data enricher 140, a controller agent 150, a rule executor 160, a proxy agent 170, an instance specific configuration service 180 and an in-memory cache 190.

The processing module P11 accesses data from one or more of a variety of sources, such as, for example, databases, messaging systems, file systems and e-mail systems, to name a few, and processes the data according to rules implemented through the instance specific configuration service 180. In this regard, the processing module P11 may access static data and dynamic data from the reference data server 90 through the proxy agent 170, which may ensure that all the data in the process space is automatically synchronized with the data in the reference data server 90. An example of static data includes data related to structure of financial instruments within a broker portfolio, while an example of dynamic data includes data related to a trade or order involving a particular financial instrument.

The in-memory cache 190 may be high performance, low latency, and be highly concurrent, so as to provide a central data storage site that provides very convenient accessibility. The in-memory cache 190 may be loaded from various data sources, such as, for example, databases, messaging systems, file systems and e-mail systems, have multiple indexes for faster retrieval of data, support transactions, and have the ability to query/retrieve using very flexible Structured Query Language (SQL)-like statements. In this regard, the results of a query may be, for example, a single column from the cache table, multiple columns from a single cache table, multiple columns from multiple cache tables, or fabricated fields from multiple columns of the cache tables. The results of a fetch may be, for example, a return of full records or a return of key records. In an exemplary embodiment of the invention, the in-memory cache 190 may store dynamic data such as, for example, orders and trades related to financial instruments, where each of the financial instruments may have an associated security ID. The reference data related to the financial instruments may in turn be accessed from the reference data server 90.

The in-memory cache 190 may be configured using any number and type of parameters, including, for example, maximum number of tables allows in the cache, maximum number of rows allowed in each table, minimum number of rows to keep in the table after performing eviction, time to expiration, eviction policies (e.g., Lease Frequently Used (LFU), Least Recently Used (LRU), Custom Eviction Policy Implementation), whether to support multiple indices on each table, whether to have the ability to load data from various data sources, such as, for example, database, messaging systems, file systems, or e-mail systems, and whether to overflow data onto a disk or database or other memory storage device when the size of the data exceeds the maximum allowed in memory. In exemplary embodiments of the invention, a user may register listeners on specific data sets to receive event notifications from the in-memory cache 190 whenever changes occur on those data sets.

The controller agent 150 controls the timing of the process performed by the task executor 100 based on the input from the flow controller 60. In this regard, the controller agent 150 may delay performance of the process by the task executor 100 for a predetermined time until one or processes from a previous stage are completed.

The rule executor 160 interprets and executes rules input from the configuration service 80. The rules may include, for example, data validation rules, data transformation rules, data enrichment rules, analytical rules and data publication rules. Rules may be specified in any suitable manner, such as, for example, defining static rules in configuration files, implementing rules as custom classes that are loaded either statically or dynamically, or specifying rules as Java language statements in configuration files, where the statements are converted into byte codes and executed at runtime. It should be appreciated that any other type of mobile code, besides Java, may be used to implement various programming functions of the present invention, such as, for example, Microsoft.NET J# Browser controls, Javascript, Microsoft Active-X controls and/or Microsoft.NET WinForms.

The adapters 110 allow the processing module P11 to interface with a variety of types of data sources so as to access data necessary for processing and to push data to the next data storage system S1 for use by processes in the following stage Stage 2. Each generic process may load the adapters required for processing by inquiring the configuration service 80 via the specific configuration service 180. The types of adapters 110 used within each processing module P11-P1n, P21-P2p, Pm1-Pmq may depend on the data sources accessed by the processing modules P11-P1n, P21-P2p, Pm1-Pmq, and may include, for example, database adapters, such DB2, Sybase, or Oracle adapters, messaging system adapters, such as EMS adapters, file system adapters, and e-mail adapters, such as POP3 adapters. E-mail adapters may be configured to retrieve data from a particular portion of an e-mail, such as the body of the e-mail or from one or more e-mail attachments. The data format and processing rules for each e-mail attachment may be different. For example, this may be useful when an e-mail has multiple attachments, and each attachment is in a different format.

The task executor 100 may be configured to process one or more tasks using multithreading. Multithreading is a well known programming technique involving branching a computer program into two or more concurrently running tasks. Multiple threads can exist within the same process and share resources such as memory. In a thread pool pattern, a number of threads may be created to perform a number of tasks, which may be organized in a queue.

The task executor 100 may be configured with concurrency features related to processing of data to complete a variety of tasks in sequence or in parallel. Such configuration may include, for example, definition of tasks independent of the threads that execute them, establishment of thread pools to maintain control of the number of threads within each logical block and the maximum number of threads per task, and establishment of completion queues to receive the completed tasks, to name a few.

Figure 3:
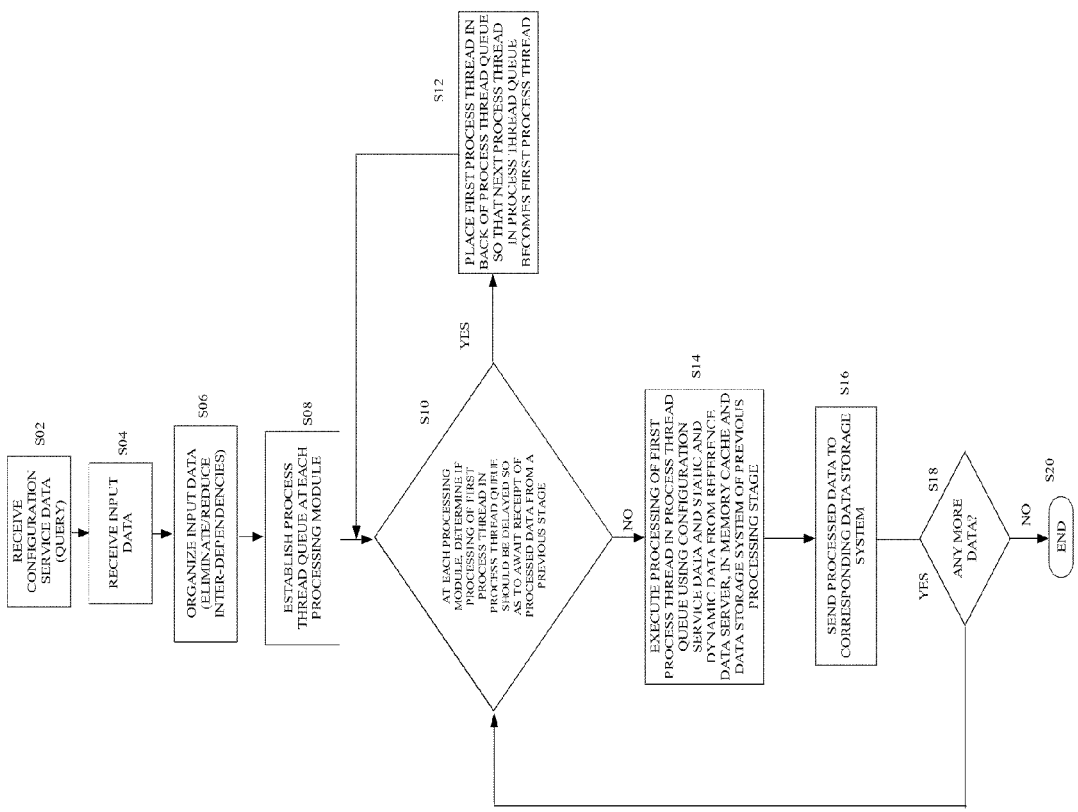
FIG. 3 is a flowchart showing a method for processing large amounts of transactional data using a processing engine according to an exemplary embodiment of the present invention.

FIG. 3 is a flowchart showing a method for processing large amounts of transactional data using the processing engine 1 according to an exemplary embodiment of the present invention. In step S02 of the process, the processing engine 1 receives configuration service data at the configuration service 80. The configuration service data may relate to a query input by a user, and may include information related to communication adapters that need to be loaded for the specific instance of the generic process, the communication queues over which the configuration service will communicate, the rules which need to be injected for the specific instance, all component specific parameters, input/output data sources, and configuration of the in-memory cache. Step S02 may be initiated by each processing module P11-P1n, P21-P2p, Pm1-Pmq contacting the configuration service 80 and requesting an instance specific configuration. Upon receipt of the instance specific configuration, the processing modules P11-P1n, P21-P2p, Pm1-Pmq may be re-initialized.

In step S04, the processing engine 1 may receive input data to be processed. Information regarding the sources of the input data may originate from the configuration service data. For example, the configuration service data may include information regarding the location of the input data, the proper format of the input data, and quality of the input data, to name a few. The input data may include both static data and dynamic data loaded into the data storage system S0 associated with the first data processing stage Stage 1. After first stage processing at the first data processing stage Stage 1, the processed input data is sent to the data storage system S1, where such data may accessed by the second data processing stage Stage 2 for further processing. Subsequent processing of the input data at the remaining data processing stages continues in the same manner.

In step S06, processing of the input data is distributed through multiple processes within a stage. In this regard, the input data may be organized so as to reduce and/or eliminate inter-dependencies within the data. Such reductions and/or elimination of inter-dependencies minimizes wait time between processing stages.

In step S08, a processing thread queue may be established at each processing module P11-P1n, P21-P2p, Pm1-Pmq. In this regard, the task executor within each processing module P11-P1n, P21-P2p, Pm1-Pmq may be configured to perform a particular task using a multithreading technique, where multiple threads may be ran concurrently or in sequence through the task executor. The processing thread queue may include all of the threads necessary to complete a task or group of tasks by the corresponding processing module.

In step S10, at each processing module P11-P1n, P21-P2p, Pm1-Pmq, it is determined whether processing of a first processing thread within the processing thread queue should be delayed so as to await receipt of the processed data from a previous stage. If so, process continues to step S12, where the first processing thread is placed in back of the processing thread queue so that the next process in the processing thread queue becomes the first processing thread. The process then returns to step S10.

If it is determined that no delay is necessary in step S10, process continues to step S14, where the first processing thread in the processing thread queue is processed. In this regard, the corresponding processing module P11-P1n, P21-P2p, Pm1-Pmq may process the first processing thread using the configuration service data and by accessing static and dynamic data from the reference data server 90, in-memory cache and data storage system of the previous processing stage.

The sequence of steps S10-S14 results in elimination and/or reduction of idle time for the processing modules P11-P1n, P21-P2p, Pm1-Pmq. If a particular processing thread can not be completed, the corresponding processing module P11-P1n, P21-P2p, Pm1-Pmq will execute another processing thread from the processing thread queue that can be completed. Thus, the overall processing of the input data is completed with increased speed and efficiency, with little to no idle time of any of the processing system components.

At step S16, the data processed at each stage Stage 1-Stage m is sent to the data storage system S0-Sm of the following stage Stage 1-Stage m. In this regard, as each processing module P11-P1n, P21-P2p, Pm1-Pmq processes data, the processed data is sent to the following data storage system S0-Sm. Thus, the processed data is immediately available for access by the following stage Stage 1-Stage m.

At step S18, it is determined whether there is any more data to be processed. If so, process returns to step S10. Otherwise, the processing ends at step S20.

Figure 4:
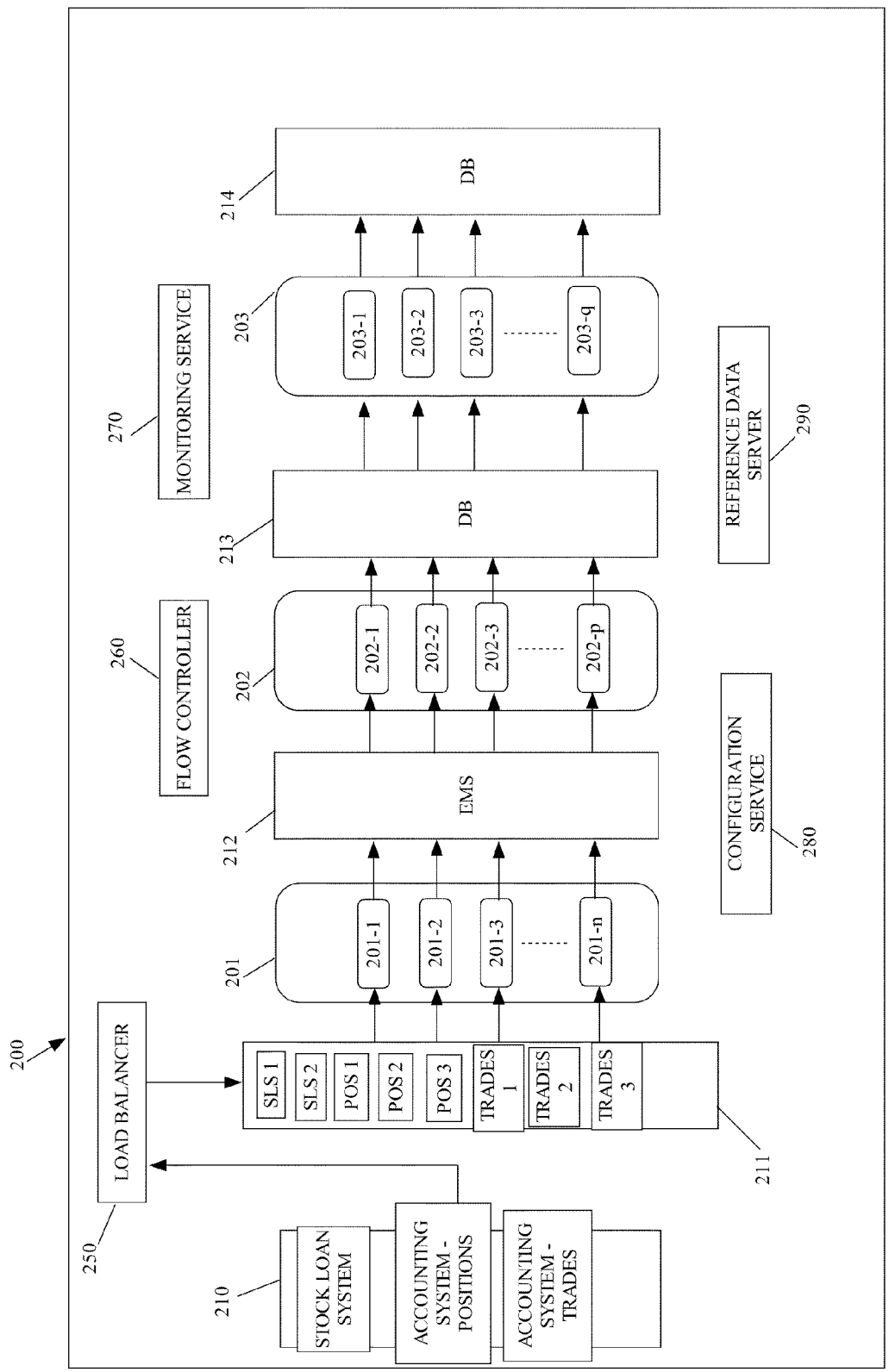
FIG. 4 is a block diagram showing the system architecture of a processing engine used within a financial instrument transaction environment according to an exemplary embodiment of the present invention.

FIG. 4 is a block diagram showing the system architecture of a processing engine, generally designated by reference number 200, used within a financial instrument transaction environment according to an exemplary embodiment of the present invention. In this example, data related to financial instrument trades is collected and recommendations are generated based on the trades to ensure funding and coverage of a financial institution's positions. The input data 210 includes information related to pending trading positions, where such data may be sourced from, for example, financial institution accounting systems or stock loan systems.

The processing engine 200 may include load balancer 250, flow controller 260, monitoring service 270, configuration service 280, reference data server 290, first data processing stage 201, second data processing stage 202 and third data processing stage 203. Prior to receipt by the first data processing stage 201, the input data 210 is organized by the load balancer 250 so that, for example, inter-dependencies within the data are reduced and/or eliminated. In this regard, the input data 210 may be organized into input data sets 212 within first data storage system 211.

In the present example, the first data processing stage 201 processes the input data 210 to generate published trade data, which is then collected in second data storage system 212. In this regard, the first data processing stage 201 may include a number of first stage processing modules 201-1-201-n that operate individually to generate published trade data. For example, each first stage processing module 201-1-201-*n* may be associated with a different publisher.

The second data storage system 212 may be, for example, an electronic messaging system, in which case the published trade data may be sent to the second data storage system 212 in e-mail message format. The second data processing stage 202 may access the e-mail messages from the data storage system 212 to generate trade data organized according to the brokers handling the trades. In this regard, the second data processing stage 202 may include a number of second stage processing modules 202-1-202-*p*, where each module corresponds to a particular broker within the financial institution. Each second stage processing module 202-1-202-*p* may generate data related to trades handled by a corresponding broker, and send the generated data to a third data storage system 213. The third data storage system 213 may be, for example, a database.

In the third data processing stage 203, the trade data stored in the third data storage system 213 may be used to generated recommendations for the financial institution. In this regard, the third data processing stage 203 may include a number of third stage processing modules 203-1-203-*q* that perform analytical processing of the data to generate recommendations. The generated recommendations may be sent to a fourth data storage system 214 for access by, for example, the financial institution. The fourth data storage system 214 may be, for example, a database.

The first, second and third stage processing modules 201-1-201-*n*, 202-1-202-*p*, 203-1-203-*q* may access the configuration service 280 to obtain configuration service data related to, for example, rules to be applied in processing the data. The configuration service 280 may be accessed to obtain static and dynamic data required to process the data. Further, each processing module 201-1-201-*n*, 202-1-202-*p*, 203-1-203-*q* has an associated in-memory cache for quick and efficient access to specific data used in the corresponding processing environment.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims and not by the foregoing specification.

What is claimed is:

1. A system comprising:
   a configuration service system that generates information related to configuration of a plurality of specific instances of a generic process to be performed on transactional data, each of the specific instances comprising a plurality of processes;
   a reference data server that stores a first set of data used in the generic process;
   a first stage processing system comprising:
   one or more first processing modules that, for each specific instance, execute at least one process of the plurality of processes that make up the specific instance based on a corresponding one of a plurality of instance specific configurations generated by the configuration service system;
   each of the one or more first processing modules comprising a first task executor, the first task executors being re-initialized based on the corresponding one of the plurality of instance specific configurations to perform one or more tasks associated with the at least one process so as to generate first stage processed transactional data, each of the one or more first processing modules comprising an in-memory cache that stores a second set of data used in the at least one process; and
   a first stage data storage system that stores the first stage processed transactional data;
   a second stage processing system comprising:
   one or more second processing modules that, for each specific instance, execute at least one process of the plurality of processes on the first stage processed transactional data based on a corresponding one of a plurality of instance specific configurations generated by the configuration service system;
   each of the one or more second processing modules comprising a second task executor, the second task executors being re-initialized based on the corresponding one of the plurality of instance specific configurations to perform one or more tasks associated with the at least one process so as to generate second stage processed transactional data, each of the one or more second processing modules comprising an in-memory cache that stores a third set of data related to the at least one process; and
   a second stage data storage system that stores the second stage processed transactional data;
   a load balancer that distributes processing load within each of the first and second stage processing systems; and
   a flow controller that manages flow of data between the first and second stage processing systems.

2. The system of claim 1, wherein each of the one or more first and second processing modules comprise a rule executor that applies an associated set of rules.

3. The system of claim 1, wherein distribution of the processing load is performed by the load balancer by eliminating interdependencies within the transactional data.

4. The system of claim 1, wherein the first set of data comprises reference data required for processing the transactional data.

5. The system of claim 1, wherein each of the one or more first and second processing modules comprises one or more adapters for interfacing with various types of data.

6. The system of claim 5, wherein the types of data are selected from the following: database data, messaging system data, file system data, and e-mail system data.

7. The system of claim 1, wherein the first and second stage data storage systems are selected from the following type of data storage systems: databases, messaging systems, files systems and e-mail systems.

8. A method of processing large amounts of transactional data, comprising the steps of:
   generating at a configuration service system information related to configuration of a plurality of specific instances of a generic process to be performed on the transactional data, each of the specific instances comprising a plurality of processes;
   storing a first set of data used in the generic process at a reference data server;
   at one or more processing modules of a first stage processing system, for each specific instance, executing at least one first process of the plurality of processes that make up the specific instance on the transactional data based on a corresponding one of a plurality of instance specific configurations generated by the configuration service system;
   the step of executing comprising:
   at each of the one or more processing modules of the first stage processing system, storing a second set of data used in the at least one first process at an in-memory cache; and at each of the one or more processing modules, re-initializing one or more first task executors based on the corresponding one of the plurality of instance specific configurations to perform one or more tasks associated with the at least one first process so as to generate first stage processed transactional data;

at one or more processing modules of a second stage processing system, for each specific instance, executing at least one second process of the plurality of processes that make up the specific instance on the first stage processed transactional data based on a corresponding one of a plurality of instance specific configurations generated by the configuration service system;

the step of executing comprising:
  at each of the one or more processing modules of the second stage processing system, storing a third set of data used in the at least one second process at an in-memory cache; and
  at each of the one or more processing modules, re-initializing one or more first task executors based on the corresponding one of the plurality of instance specific configurations to perform one or more tasks associated with the at least one second, process so as to generate second stage processed transactional data;

managing using a flow controller flow of data between the first and second stage processing systems; and distributing using a load balancer processing load within each of the first and second stage processing systems.

9. The method of claim 8, wherein the steps of executing are performed using a multithreading technique.

10. The method of claim 8, wherein the steps of executing comprise application by the first and second processing modules of an associated set of rules.

11. The method of claim 8, wherein the step of distributing comprises at least one of eliminating and reducing interdependencies within the transactional data.

12. The method of claim 8, further comprising modifying format of data at data adapters associated with each of the first and second processing modules so that the first and second processing modules are capable of interfacing with the reference data server.

13. The method of claim 12, wherein the step of modifying comprises converting the data to one or more of the following formats: database data, messaging system data, file system data and e-mail system data.

14. A computer system comprising one or more processors, one or more communication devices operatively connected to the one or more processors, and one or more computer-readable media containing computer-readable instructions executable on the one or more processors, the instructions being related to performance of a method for processing large amounts of transactional data, comprising the steps of:

generating at a configuration service system information related to configuration of a plurality of specific instances of a generic process to be performed on the transactional data, each of the specific instances comprising a plurality of processes;

storing a first set of data used in the generic process at a reference data server;

at one or more processing modules of a first stage processing system, for each specific instance, executing at least one first process of the plurality of processes that make up the specific instance on the transactional data based on a corresponding one of a plurality of instance specific configurations generated by the configuration service system;

the step of executing comprising:
  at each of the one or more processing modules of the first stage processing system, storing a second set of data used in the at least one first process at an in-memory cache; and
  at each of the one or more processing modules, re-initializing one or more first task executors based on the corresponding one of the plurality of instance specific configurations to perform one or more tasks associated with the at least one first process so as to generate first stage processed transactional data;

at one or more processing modules of a second stage processing system, for each specific instance, executing at least one second process of the plurality of processes that make up the specific instance on the first stage processed transactional data based on a corresponding one of a plurality of instance specific configurations generated by the configuration service system;

the step of executing comprising:
  at each of the one or more processing modules of the second stage processing system, storing a third set of data used in the at least one second process at an in-memory cache; and
  at each of the one or more processing modules, re-initializing one or more first task executors based on the corresponding one of the plurality of instance specific configurations to perform one or more tasks associated with the at least one second process so as to generate second stage processed transactional data;

managing using a flow controller flow of data between the first and second stage processing systems; and distributing using a load balancer processing load within each of the first and second stage processing systems.

15. The computer system of claim 14, wherein the steps of executing are performed using a multithreading technique.

16. The computer system of claim 14, wherein the information generated by the configuration service system comprises rules related to the plurality of processes, and the steps of executing comprise application by the first and second processing modules of an associated set of rules.

17. The computer system of claim 14, wherein the step of distributing comprises at least one of eliminating and reducing interdependencies within the transactional data.

18. The computer system of claim 14, further comprising modifying format of data at data adapters associated with each of the first and second processing modules so that the first and second processing modules are capable of interfacing with the reference data server.

19. The computer system of claim 18, wherein the step of modifying comprises converting the data to one or more of the following formats: database data, messaging system data, file system data and e-mail system data.

* * * * *